United States Patent [19]
Grobecker

[11] Patent Number: 5,938,021
[45] Date of Patent: Aug. 17, 1999

[54] HINGED HOUSING FOR HOLDING A DISC-SHAPED INFORMATION CARRIER

[75] Inventor: Hermann Grobecker, Garbsen, Germany

[73] Assignee: U.S. Philips Corporation, New York, N.Y.

[21] Appl. No.: 09/090,597

[22] Filed: Jun. 4, 1998

[30] Foreign Application Priority Data

Jun. 5, 1997 [DE] Germany ............ 197 23 503

[51] Int. Cl.⁶ ............ B65D 85/57; B65D 43/16
[52] U.S. Cl. ............ 206/308.1; 220/840
[58] Field of Search ............ 206/308.1, 310, 206/308.3; 220/836, 840, 842

[56] References Cited

U.S. PATENT DOCUMENTS

| | | | |
|---|---|---|---|
| 4,549,670 | 10/1985 | Trendler | 220/840 X |
| 4,793,480 | 12/1988 | Gelardi et al. | 206/310 X |
| 5,158,176 | 10/1992 | Wolf | 206/308.1 |
| 5,259,498 | 11/1993 | Weisburn et al. | 206/310 X |
| 5,638,838 | 6/1997 | Lombardi | 220/840 X |
| 5,682,991 | 11/1997 | Lammerant et al. | 206/308.1 |

FOREIGN PATENT DOCUMENTS

8523194 U  11/1985  Germany.

*Primary Examiner*—Bryon P. Gehman
*Attorney, Agent, or Firm*—Leroy Eason

[57] ABSTRACT

A two-part housing, for holding a disc-shaped information carrier (15), for example a CD, has a bottom section (10), a cover section (11) connected to the bottom section via two corner hinges a (12, 13), and a clamping device (14, 14') for holding the information carrier (15). A simple fracture-proof hinge structure is provided in, that the cover section (11) comprises two hinge arms (18) whose free end portions (19) are bent through 180° towards the cover section (11) and are resilient, the bottom section (10) has corner recesses (22) adapted to the hinge arms (18), and the free end portions (19) of the hinge arms (18), which end portions face one another, form in conjunction with rigid hinge walls (24) the corner hinges (12, 13).

10 Claims, 5 Drawing Sheets

HINGED HOUSING FOR HOLDING A DISC-SHAPED INFORMATION CARRIER

BACKGROUND OF THE INVENTION

1. Field of the Invention

The invention relates to a housing for accommodating a disc-shaped information carrier, for example a Compact Disc, having a bottom section, having a cover section connected to said bottom section via two corner hinges, and having a clamping device for holding the information carrier.

2. Description of the Related Art

Such a housing is known, for example from DE-GM 85 23 194. In this known housing the bottom section has two raised side walls in the hinge area. Further side walls situated on the cover section and spaced at a smaller distance from one another than the side walls of the bottom section engage between the last-mentioned side walls. A pivotal coupling between the bottom section and the cover section is formed by pins in side walls of one section which engage bores in side walls of the other section. In the known construction the side walls of the bottom section have recesses having inclined walls, which recesses are engaged by correspondingly shaped inclined side walls of the cover section. The narrow front side of the cover section, which faces the hinges, further has two non-positive latching elements which engage with an oppositely inclined portion of the bottom section. Moreover, at its front side which faces the hinges, the bottom section has a receding surface to facilitate opening of the housing.

SUMMARY OF THE INVENTION

It is an object of the invention to provide a particularly reliable shockproof and fracture-proof hinge device in a housing of the type defined in the opening paragraph, which is of simple manufacture and a trouble-free mechanized assembly of the housing.

According to the invention the cover section has hinge arms which are formed which have extensions of the cover section and by free end portions which are bent though 180° and are shaped in such a manner that they have a small clearance with respect to the cover section. Thus, it is achieved that these free end portions of the hinge arms have a satisfactory resilience, so that pins arranged on the inner sides of the free end portions are engageable in holes in correspondingly shaped hinge walls of the bottom section and thus allow pivotal movement. Consequently, the hinges are no longer situated at the outer surfaces of the housing but at shielded locations in corner recesses of the bottom section. Owing to the 180° bending of the hinge arms, in accordance with the invention, an ideal possibility is obtained to round the corresponding corners of the cover section.

The invention can be applied both to a housing without a special tray, and to a housing which comprises a special tray.

The free end portions of the hinge arms may have inwardly projecting pins, which achieves a particularly simple manufacture. However, as an alternative it is possible to form the pins on the hinge walls of the bottom section and the bores in the free hinge arms. Furthermore, instead of the bores tapered holes may be provided, which are engageable from above.

The cover section may allow opening up to an angle of approximately 180° or 185°. This prevents the cover from swinging around completely and, consequently, a leaflet accommodated in the cover from falling out.

By providing a stop for the end surface of the hinge arm it is achieved that the cover section can be closed without being obstructed by the projecting stop.

By providing a box-shaped compartment in the housing a particularly stable and fracture-proof construction for the hinges can be obtained. Also, it can be achieved; that the hollow compartment wall forming a grip portion is situated directly opposite corresponding wall portions of the cover, so that an additional protection against breaking of the hinge is obtained in the event of impact forces exerted on the side of the closed housing.

A suitably formed insert can be fitted into the hollow compartment to provide additional stabilization. Another possibility is to adapt this insert for holding special additional elements, for example anti-theft devices or enclosures for sales promotion of the product.

Such an insert holder, can contain for example information material, anti-theft elements or the like, so that it can be retained in said hollow compartment in a reliable manner. If, in addition, there are provided, for example, latching means at the ends, for example barb-shaped elements, in conjunction with suitably shaped openings, an insert of this type, once it has been inserted and latched in place, can hardly be removed without resort to force and without being destroyed. This is particularly advantageous when such a trough-shaped holder accommodates anti-theft means.

BRIEF DESCRIPTION OF THE DRAWING

Embodiments of the invention are shown diagrammatically, by way of examples, in FIGS. 1 to 7 of the drawings; wherein.

DESCRIPTION OF THE PREFERRED EMBODIMENTS

Figure 1:
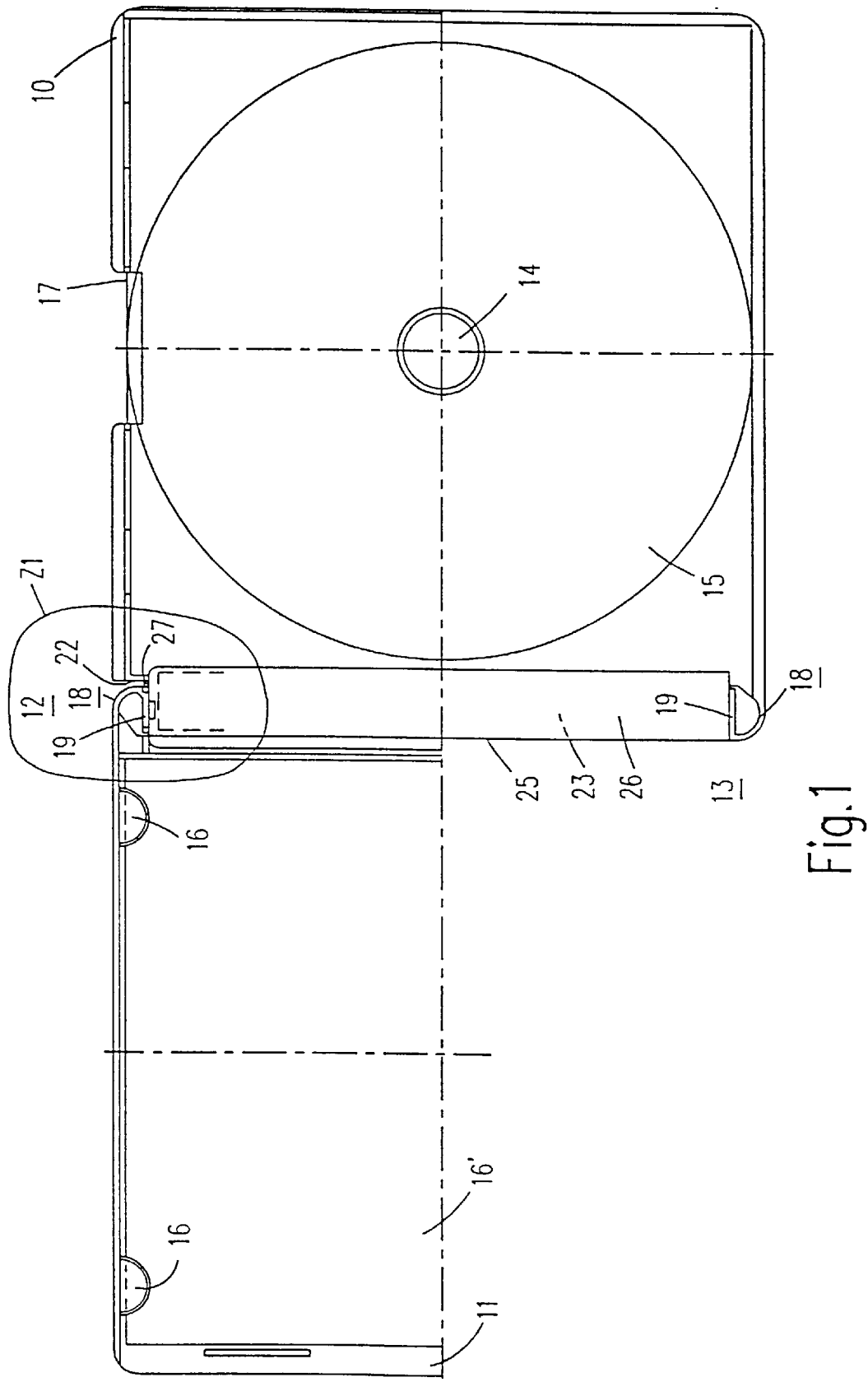
FIG. 1 is a plan view of a housing which comprises a bottom section and a cover section, the lower half showing the closed housing and the upper half shows the opened housing with one half of the cover being shown at the left.

As shown in FIG. 1, the two-part housing comprises a bottom section 10 and a cover section 11, which are articulated to one another by means of two corner hinges 12, 13. The bottom section comprises a centrally disposed clamping device 14 for holding a Compact Disc 15 by clamping. Raised lugs 16 are arranged on the cover section 11 to hold an inserted booklet 16'. Recessed portions 17 facilitate the removal of the Compact Disc 14 from the bottom section 10.

Figure 2:
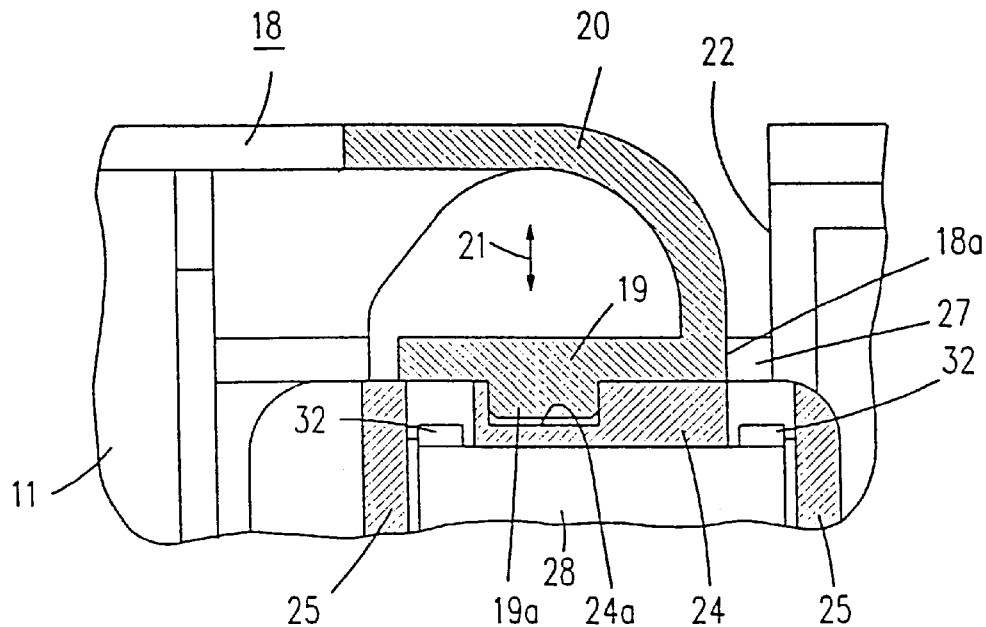
FIG. 2 is a partly sectional enlarged-scale view of the part $Z_1$, in FIG. 1.
Figure 3:
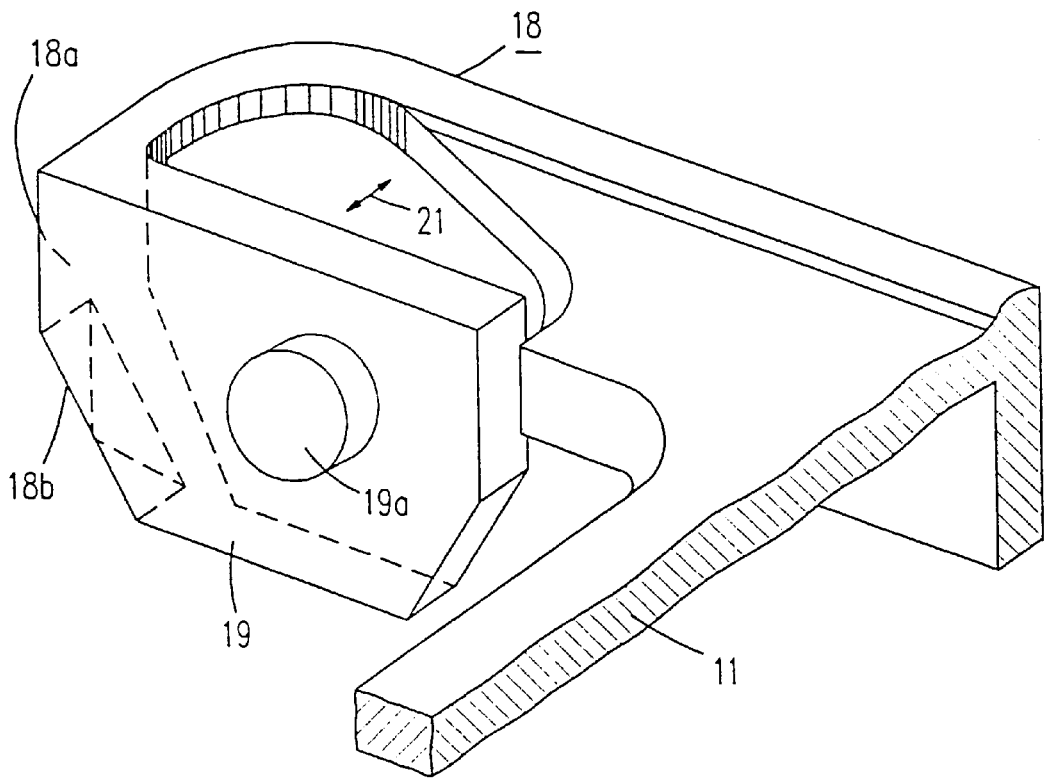
FIG. 3 is an enlarged-scale perspective view of this part $Z_1$, in FIG. 1, viewed from the same direction as in FIG. 4.

As is shown in FIGS. 2 and 3, each corner hinge 12, 13 has a hinge arm 18, whose free end portion 19 is bent through 180° towards the cover section 11. This provides the possibility of giving the cover section a convenient curvature in the corner area 20 and, as a result of this, the free end portion 19 becomes resilient in a direction 21.

Figure 5:
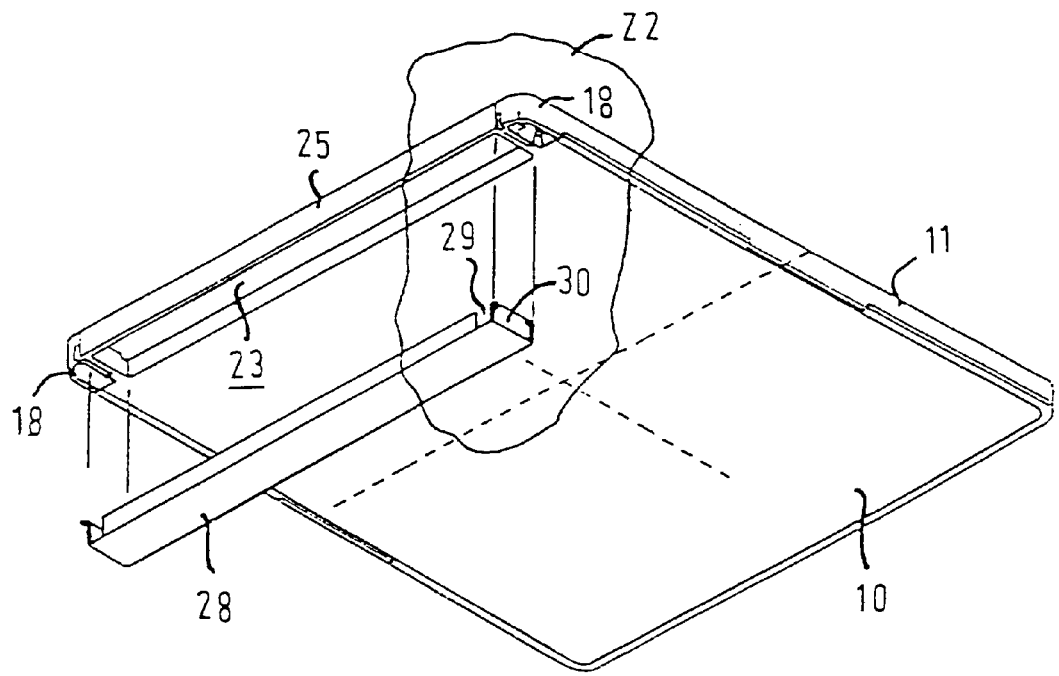
FIG. 5 is a perspective underneath view of the closed housing.
Figure 6:
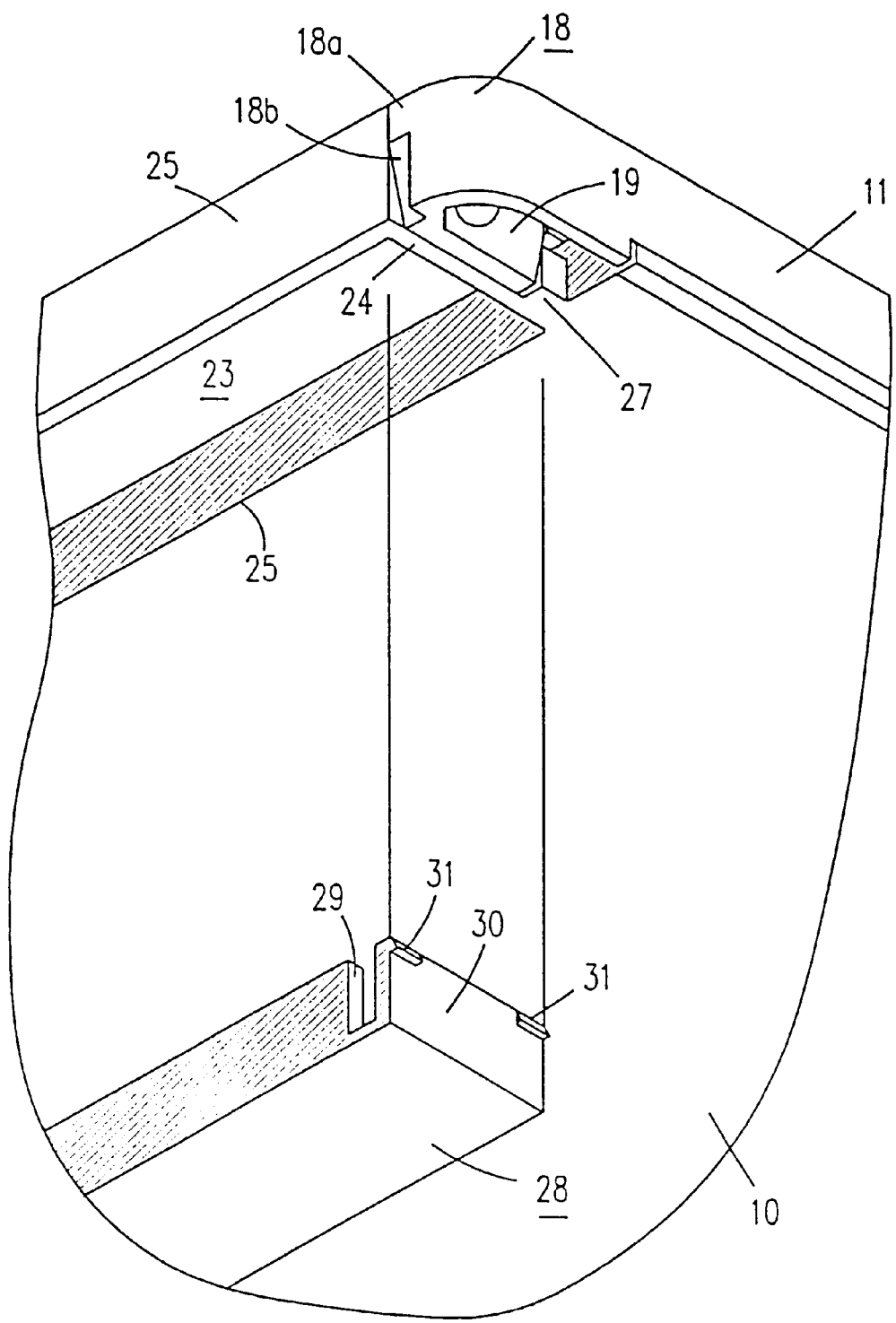
FIG. 6 shows a part $Z_2$ indicated in FIG. 5.

For the flush engagement of the two corner hinges 12, 13 the bottom section 10 has corner recesses 22, between which a downwardly open hollow box-shaped compartment 23 extends (FIGS. 5 and 6). The hollow compartment 23 is bounded by hinge walls 24 at the ends, by side walls 25 at the long sides and by a grip portion 26 at the top, which grip portion is coplanar with the cover section 11 and is flush with the latter when the housing is closed. In the present example, the corner hinges comprise pins 19a on the free end portions 19, which pins engage bores 24a in the hinge walls 24.

In a corner of each of the corner recesses 22 a stop 27, which is flush with the outer surface of the bottom section 11, is arranged and lies against the hinge arm in the area 18a when the cover 11 has been opened through an angle of approximately 180° to 185°. An inclined portion 18b prevents the closing movement from being blocked by the stop 27. The stop 27 and the inclined portion 18b are clearly visible particularly in FIG. 6.

Figure 4:
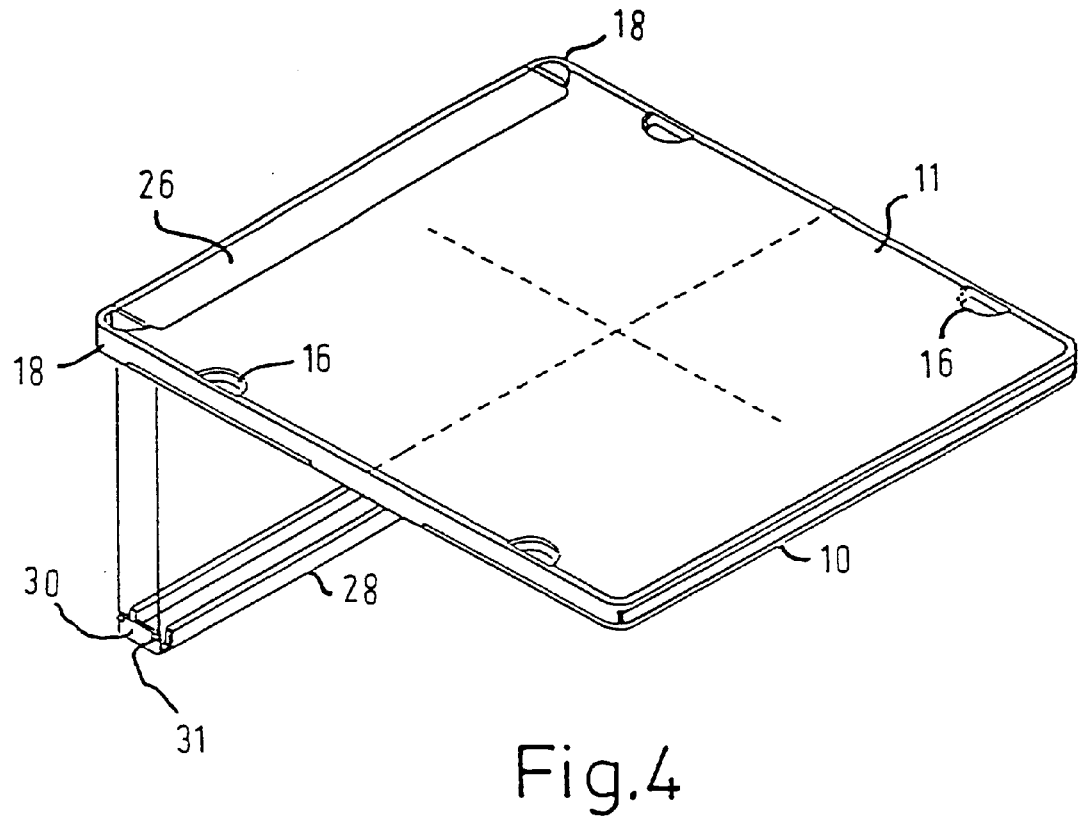
FIG. 4 is a perspective top view of the closed housing.

FIGS. 4, 5 and 6 show a possibility of mounting a trough-shaped holder 28, which is open at the top, in the hollow compartment 23. This holder 28 has resilient end walls 30 formed by means of notches 29, which walls carry barbs 31. When the holder 28 is introduced into the hollow compartment 23 the barbs snap into corresponding recesses 32 in the inner surfaces of the hinge walls 24. The holder 28 closes the hollow compartment 23 and serves for holding various kinds of articles, for example so-called glitter rods which contain a fluid in which particular particles are suspended. Furthermore, such a holder can hold, for example, an anti-theft device. This is particularly advantageous because after the holder 28 has been mounted it is substantially impossible to remove the holder without parts being damaged. Furthermore, paper strips provided with certain information can be placed in the holder 28, which like the bottom section and the cover section is made of a transparent plastic. Such strips can also be wrapped around the holder and can then be inserted into the hollow compartment 23 together with the holder.

Figure 7:
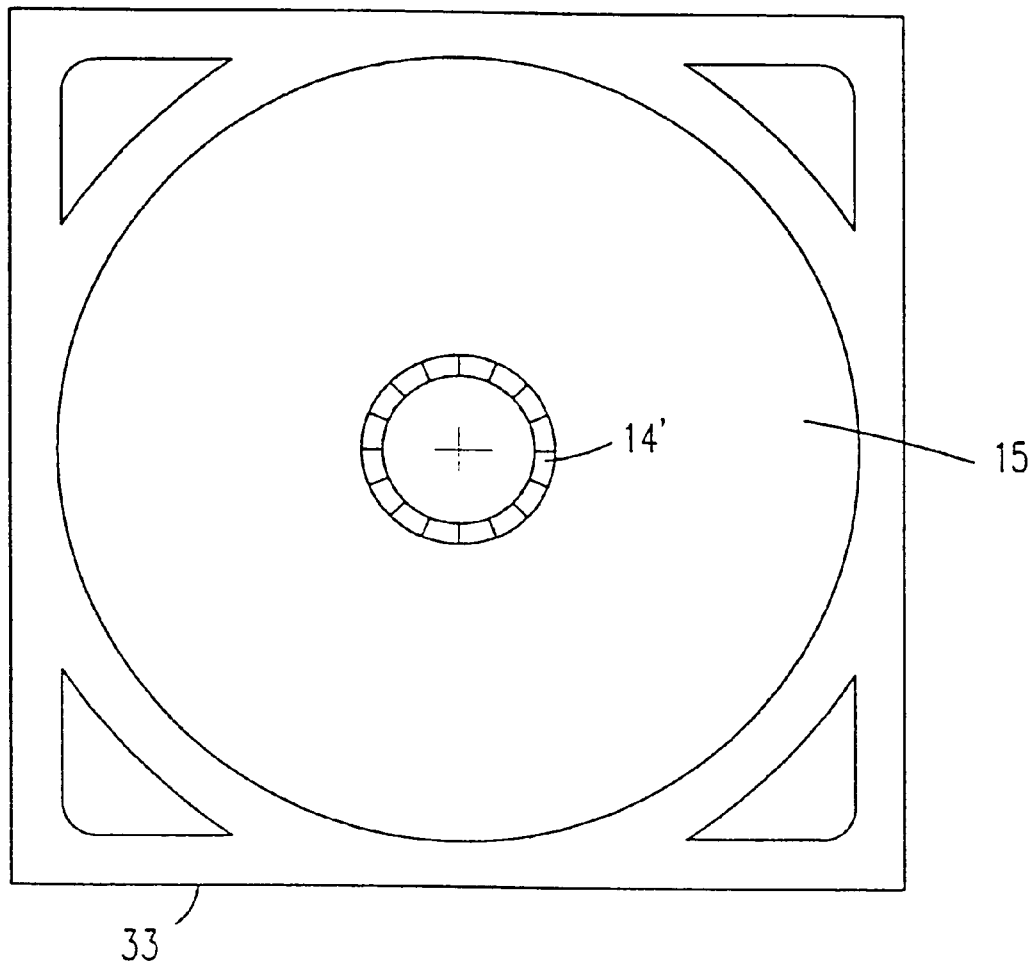
FIG. 7 shows a tray having a clamping device and adapted to be mounted in a housing.

FIG. 7 is a plan view which shows a tray 33 which comprises a clamping device 14' for holding an information carrier (15) and which can be mounted in the housing.

I claim:

1. A two-part housing for holding a disc-shaped information carrier, having a bottom section (10) and a cover section (11) which are coupled together by two corner hinges (12, 13), and a clamping device (14, 14') for clamping the information carrier in position; and wherein:

the cover section (11) comprises two hinge arms (18) extending therefrom, each hinge arm having a free end portion (19) which is bent back 180° towards the cover section and is resilient;

the bottom section (10) has two corner recesses (22) for receiving the free end portions (19) of the hinge arms (18), each recess having a rigid hinge wall (24); and the free end portions (19) of the hinge arms (18) face one another and, in conjunction with the rigid hinge walls (24), form the two corner hinges (12, 13).

2. A housing as claimed in claim 1, wherein the clamping device (14) is integral with the bottom section (10).

3. A housing as claimed in claim 1, wherein the clamping device (14') is on a tray (33) mounted in the housing.

4. A housing as claimed in claim 1, wherein the free end portions (19) of the hinge arms (18) have inwardly projecting pins (19a) for engagement in corresponding bores (24a) in the hinge walls (24).

5. A housing as claimed in claim 1, wherein a projecting stop (27) is included in each of said corner recesses (22) near an outer surface of the bottom section (10), which stop abuts against an area (18a) of the free end portion (19) of a respective hinge arm (18), which area (18a) is near an other surface of the cover section (11) when said cover section is opened through an angle of approximately 180°.

6. A housing as claimed in claim 5, wherein the end portion (19) of each hinge arm (18) has an inclined area (18b) below the abutment area (18a) for said stop (27).

7. A housing as claimed in claim 1, wherein an upwardly or downwardly open hollow box-shaped compartment (23) extends between the corner recesses (22) of the bottom section (10) and is bounded at opposite ends thereof by the two hinge walls (24) of the corner recesses (22).

8. A housing as claimed in claim 7, wherein in the case of a downwardly open hollow box-shaped compartment (23) the wall (26) facing the open side thereof serves as a grip portion which is coplanar with the cover section (11) when the cover section is closed.

9. A housing as claimed in claim 7, wherein the hollow compartment (23) includes latching means (32) to receive and hold an insert (28) in said compartment.

10. A housing as claimed in claim 9, wherein the insert (28) is a trough-shaped holder adapted to be inserted into hollow compartment (23) and having end walls 30 which are resilient and include latching means (31) which cooperate with said latching means (32) of the compartment (23).

* * * * *